(No Model.)

T. R. CRANE.
FERTILIZER FEED FOR DRILLS.

No. 319,393. Patented June 2, 1885.

WITNESSES:
B. E. W. Boyden.
John E. Morris.

INVENTOR:
Thos. R. Crane
By Chas. B. Mann
Attorney.

UNITED STATES PATENT OFFICE.

THOMAS R. CRANE, OF HEATHSVILLE, VIRGINIA.

FERTILIZER-FEED FOR DRILLS.

SPECIFICATION forming part of Letters Patent No. 319,393, dated June 2, 1885.

Application filed April 14, 1885. (No model.)

*To all whom it may concern:*

Be it known that I, THOMAS R. CRANE, a citizen of the United States, residing at Heathsville, in the county of Northumberland and State of Virginia, have invented certain new and useful Improvements in Fertilizer-Feeds for Drills, of which the following is a specification.

My invention relates to an improved fertilizer-feed for drills.

The object is to provide a combined feed-agitator and scrapers for fertilizer-boxes of drills which will prevent the fertilizer from packing and choking in the box, and effect a regular feed.

The construction of my improved device will first be described and then claimed.

The invention is illustrated in the accompanying drawings, in which—

Figure 1:
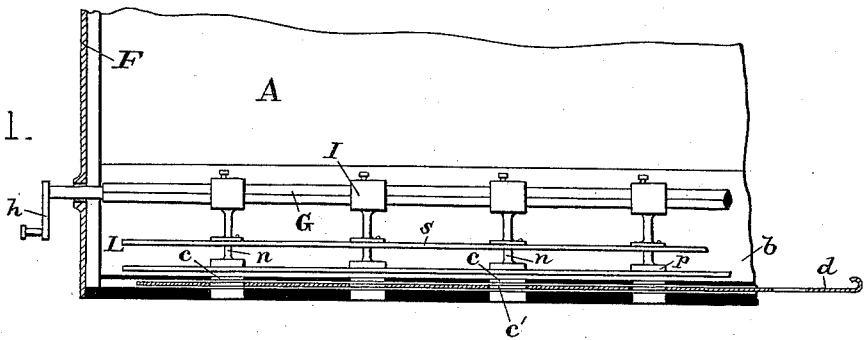
Figure 2:
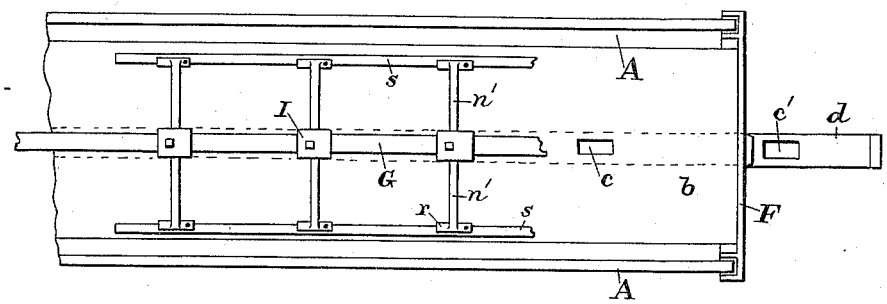
Figure 3:
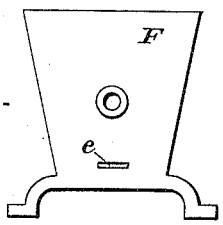
Figure 4:
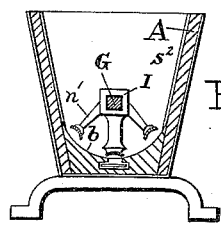
Figure 5:
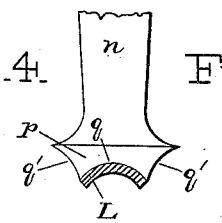
Figure 6:
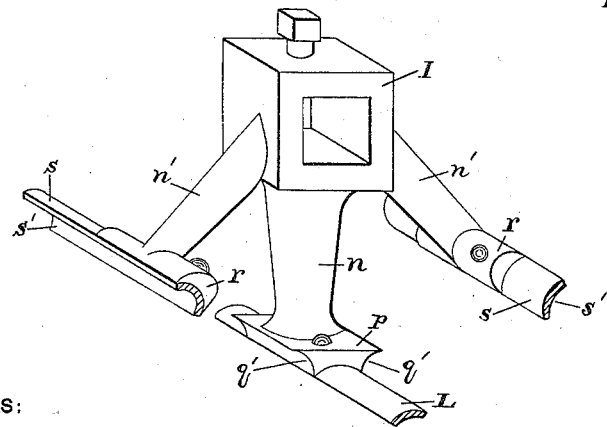

Figure 1 is a vertical section of part of a fertilizer-box, showing the feed-agitator and scrapers. Fig. 2 is a top view of the box, concave feed-agitator, and scrapers. Fig. 3 is an outside view of the end of the box. Fig. 4 is a cross-section of the box, showing the feed-agitator and scrapers. Fig. 5 is a view of the feed-agitator arm. Fig. 6 is a view of the feed-agitator and scraper-prongs with bars attached.

The fertilizer-box, as usual, has sloping sides A and a concaved or rounded bottom, $b$. The bottom is provided with discharge-openings $c$, arranged in a line extending lengthwise of the box, and a flat bar, $d$, occupies guides in or below the concaved bottom, and is provided with openings $c'$. This flat bar projects through a slot, $e$, at one end, F, of the box, and is movable endwise in the guides. This well-known device serves to regulate or entirely stop the discharge of the fertilizer through the openings $c$.

A rock-shaft, G, extends lengthwise through the box, and has bearings in the ends F, and may have bearings also intermediate of the ends. One end of this shaft projects outside and has a crank-arm, $h$, which is designed to be suitably connected in some well-known manner to driving mechanism which will impart to the said crank-arm a vibrating movement, and thereby cause the shaft G in the box to rock.

The improved feed-agitator and scrapers are attached to the rock-shaft. The said devices consist of a head, I, which is slipped on the end of the rock-shaft and made fast thereto in such position that one will be above each discharge-opening $c$ in the concaved bottom. The feed-agitator arm $n$ and side scraper prongs, $n'$, project from the head. The center or feed arm, $n$, has at its end a foot, $p$, provided with a bottom concave, to which a bar, L, is attached. This bar on its lower side or face has a longitudinal concave, $q$. The feed-arm foot $p$ also has each side of the bottom, where the bar L is attached, an inclined concave, $q'$. This construction of feed-foot is novel and possesses advantages which will be explained hereinafter.

A scraper-prong $n'$ is attached at each side of the feed-arm $n$, and each prong has a foot, $r$, for attachment of one of the scraper-bars $s$. The face of each scraper-bar has a longitudinal concave, $s'$.

In operation the movement of the rock-shaft causes the arms, prongs, and their attached bars to vibrate crosswise of the concave bottom. As the bulk of the fertilizer in the box is above the said bars, the scraper-bars $s$ serve to keep the concave surface scraped, and prevent the fertilizer from adhering thereto and from choking on the sloping sides of the box just above the said concave.

At the highest point to which the scraper-bars swing up a space, $s^2$, (see Fig. 4,) is left between the concave face $s'$ of each of said bars and the sloping side A of the box, and into this space the lumps of fertilizer fall. In this position the concave face $s'$ of the scraper-bar tends to retain these falling lumps, and then as the scraper-bar swings down the said lumps are crushed. In this way the two side scraper-bars, $s$, coact with the feed and agitator bar L, and aid in effecting the regular discharge of the fertilizer. By the action of the side scraper-bars the fertilizer is prepared for the action of the foot $p$ on the feed-arms and the concaved bottom of the foot or bar L, attached to them. The inclined concave $q$ on the foot each side of the bar L serves to crowd the fertilizer which is on the bottom $b$ toward the discharge-opening $c$, while the concaved bottom of the foot, or the bar L moving close across the said bottom, sweeps the fertilizer into the openings $c$.

Having described my invention, I claim and desire to secure by Letters Patent of the United States—

1. A fertilizer-feed device for drills, having a head, I, provided with a feed-agitator arm, $n$, and a scraper-prong, $n'$, each side thereof, a bar, L, attached to the feed-arm, and a concaved scraper-bar, $s$, attached to each scraper-prong, as set forth.

2. A fertilizer-feed device for drills, having a head, I, provided with a feed-agitator arm, $n$, a foot, $p$, at the end of the arm, having attached to its bottom a bar, L, and at each side an inclined concave, $q'$, as set forth.

3. In combination with a fertilizer-box having sloping sides and a concaved bottom, and a rock-shaft, the head I, fixed to the rock-shaft and provided with an arm, $n$, having a foot, $p$, with a concaved bottom and an inclined concave, $q'$, at each side, a prong, $n'$, at each side of the said arm, and a concaved bar, $s$, attached to each prong, as set forth.

In testimony whereof I affix my signature in presence of two witnesses.

THOMAS R. CRANE.

Witnesses:
JOHN E. MORRIS,
JNO. T. MADDOX.